(12) United States Patent
Gakhar et al.

(10) Patent No.: US 11,184,434 B2
(45) Date of Patent: Nov. 23, 2021

(54) TOP-OF-RACK SWITCH REPLACEMENT FOR HYPER-CONVERGED INFRASTRUCTURE COMPUTING ENVIRONMENTS

(71) Applicant: VMWARE, INC., Palo Alto, CA (US)

(72) Inventors: Suket Gakhar, Bangalore (IN); Vishesh Kumar Nirwal, Bangalore (IN); Prafull Kumar, Palo Alto, CA (US); Santoshkumar Babalad, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 112 days.

(21) Appl. No.: 16/668,097

(22) Filed: Oct. 30, 2019

(65) Prior Publication Data

US 2020/0092359 A1   Mar. 19, 2020

Related U.S. Application Data

(63) Continuation of application No. 15/684,972, filed on Aug. 24, 2017, now Pat. No. 10,476,951.

(30) Foreign Application Priority Data

Jul. 4, 2017   (IN) .............................. 201741020794

(51) Int. Cl.
*H04L 29/08* (2006.01)
*H04L 12/24* (2006.01)
*H04L 12/26* (2006.01)

(52) U.S. Cl.
CPC ...... *H04L 67/1031* (2013.01); *H04L 41/0668* (2013.01); *H04L 41/0846* (2013.01); *H04L 41/0856* (2013.01); *H04L 43/0817* (2013.01); *H04L 43/16* (2013.01)

(58) Field of Classification Search
CPC . H04L 67/1031; H04L 43/16; H04L 41/0856; H04L 43/0817; H04L 41/0668; H04L 41/0846
See application file for complete search history.

(56) References Cited

U.S. PATENT DOCUMENTS

| | | | |
|---|---|---|---|
| 2017/0346760 A1* | 11/2017 | Kelly | H04L 67/1097 |
| 2018/0002496 A1 | 1/2018 | Mao et al. | |
| 2018/0241643 A1* | 8/2018 | Chaganti | G06F 3/061 |
| 2018/0276019 A1 | 9/2018 | Ali et al. | |

* cited by examiner

*Primary Examiner* — Jung H Park
(74) *Attorney, Agent, or Firm* — Thomas Horstemeyer, LLP (57) ABSTRACT

Disclosed are various examples for top-of-rack (TOR) switch replacement in hyper-converged computing environments. A bring-up network configuration is applied to a network switch to install the network switch in a rack. An active workload within the rack is analyzed to identify a workload network configuration for the active workload. The active workload is reassigned to the network switch from a faulty network switch. The network switch is configured based on the workload network configuration for the active workload.

20 Claims, 10 Drawing Sheets

| workload_id | host_id | host_status | rack_id | workload_bundle |
|---|---|---|---|---|
| ... | ... | ... | ... | ... |
| A | N8 | operational | R1 | bundleA |
| A | N9 | operational | R1 | bundleA |
| A | N10 | not operational | R1 | bundleA |
| B | N5 | operational | R2 | bundleB |
| B | N4 | operational | R3 | bundleB |
| B | N3 | operational | R4 | bundleB |
| B | N10 | not operational | R1 | bundleB |
| C | N1 | operational | R1 | bundleC |
| C | N0 | operational | R2 | bundleC |
| C | N11 | operational | R2 | bundleC |
| C | N10 | not operational | R1 | bundleC |
| ... | ... | ... | ... | ... |

FIG. 4

| workload_id | workload_type | rack_id | switch_id | operation_type | operation_data | switch_type | task_type | timestamp |
|---|---|---|---|---|---|---|---|---|
| ... | ... | ... | ... | ... | ... | ... | ... | ... |
| A | TypeA | Rack1 | TOR1 | set_time | 1481169788 | TOR | switch_bring_up | 1581256788 |
| B | TypeA | Rack1 | TOR2 | set_time | 1481169788 | TOR | switch_bring_up | 1581256788 |
| C | TypeB | Rack1 | TOR1 | set_ntp | {ntpserver:192... | TOR | switch_bring_up | 1581256788 |
| D | TypeC | Rack1 | TOR2 | set_ntp | {ntpserver:192... | TOR | switch_bring_up | 1581256788 |
| E | TypeB | Rack2 | TOR1 | set_switch_ip | {ip:192... | | | |
| ... | ... | ... | ... | ... | ... | | | |

FIG. 5

| workload_id | workload_type | rack_id | switch_id | operation_type | operation_data | switch_type | vcf_task | timestamp |
|---|---|---|---|---|---|---|---|---|
| ... | ... | ... | ... | ... | ... | ... | ... | ... |
| WLD_1 | management_cluster | Rack1 | TOR1 | set_time | 1481169788 | TOR | switch_bring_up | 1581256788 |
| WLD_2 | management_cluster | Rack1 | TOR2 | set_time | 1481169788 | TOR | switch_bring_up | 1581256788 |
| WLD_3 | TypeB | Rack1 | TOR1 | set_ntp | {ntpserver:192... | TOR | switch_bring_up | 1581256788 |
| WLD_4 | TypeC | Rack1 | TOR2 | set_ntp | {ntpserver:192... | TOR | switch_bring_up | 1581256788 |
| WLD_5 | TypeB | Rack2 | TOR1 | set_switch_ip | {ip:192... | TOR | switch_bring_up | 1581256788 |
| ... | ... | ... | ... | ... | ... | ... | ... | ... |

*FIG. 6*

| workload_type | workload_id | rack_id | switch_id | switch_config_type | operation_data | switch_type | vcf_task | timestamp | port_numbers | host_names |
|---|---|---|---|---|---|---|---|---|---|---|
| ... | ... | ... | ... | ... | ... | ... | ... | ... | ... | ... |
| management_cluster | WLD_1 | Rack 1 | TOR 1 | create_vlan | {"name":"bondname","id":"1030","t... | TOR | create_workload | 1581256788 | [swp5,swp6,swp7] | [Node8,Node9,Node10] |
| management_cluster | WLD_1 | Rack 1 | TOR 2 | create_vlan | {"name":"bondname","id":"1030","t... | 1003a | create_workload | 1581256788 | [swp5,swp6,swp7] | [Node8,Node9,Node10] |
| ... | ... | ... | ... | create_lacp | {"name":"bondname","id":"1030","t... | | create_workload | | | |
| ... | ... | ... | ... | config_mtu | | | | | | |
| VI | WLD_2 | Rack 1 | TOR 1 | delete_vlan | {"name":"bondname","id":"1030","t... | TOR | delete_workload | 1581256788 | [swp5,swp6,swp7] | [Node8,Node9,Node10] |
| ... | ... | ... | ... | ... | ... | ... | ... | ... | ... | ... |

703

```
{
  "name":"bondname",
  "id":"1030",
  "taggedPorts":["swp5","swp6","swp7"],
  "untaggedPorts":null,
  "ipAddress":null,
  "netmask":null,
  "igmp":null,
  "mtu":null
}
```

| workload_type | workload_id | rack_id | switch_id | switch_config_type | operation_data | switch_type | vcf_task | timestamp | port_numbers | host_names |
|---|---|---|---|---|---|---|---|---|---|---|
| ... | ... | ... | ... | ... | ... | ... | ... | ... | ... | ... |
| VI | WLD_2 | Rack 1 | TOR 1 | create_vlan | {"name":"bondname","id":"1030","t... | TOR | create_workload | 1581256788 | [swp5,swp6,swp7] | [Node4,Node5,Node6] |
| VI | WLD_2 | Rack 1 | TOR 2 | create_vlan | {"name":"bondname","id":"1030","t... | TOR | create_workload | 1581256788 | [swp5,swp6,swp7] | [Node4,Node5,Node6] |
| ... | ... | ... | ... | create_lacp | | | create_workload | | | |
| ... | ... | ... | ... | config_mtu | | | create_workload | | | |
| VI | WLD_2 | Rack 1 | TOR 1 | delete_vlan | {"name":"bondname","id":"1030","t... | TOR | delete_workload | | | |
| ... | ... | ... | ... | delete_lacp | | | delete_workload | | | |
| ... | ... | ... | ... | create_vlan | | | workload_expansion | | | |
| ... | ... | ... | ... | create_vlan | | | workload_expansion | | | |
| ... | ... | ... | ... | delete_vlan | | | workload_contraction | | | |
| ... | ... | ... | ... | ... | ... | ... | ... | ... | ... | ... |

803

```
{
  "name":"bondname",
  "id":"1030",
  "taggedPorts":["swp5","swp6","swp7"],
  "untaggedPorts":null,
  "ipAddress":null,
  "netmask":null,
  "igmp":null,
  "mtu":null
}
```

TOP-OF-RACK SWITCH REPLACEMENT FOR HYPER-CONVERGED INFRASTRUCTURE COMPUTING ENVIRONMENTS

CROSS-REFERENCE TO RELATED APPLICATIONS

This application is a continuation of, and claims priority to, U.S. application Ser. No. 15/684,972, filed on Aug. 24, 2017, and entitled "TOP-OF-RACK SWITCH REPLACEMENT FOR HYPER-CONVERGED INFRASTRUCTURE COMPUTING ENVIRONMENTS," and also claims priority to and the benefit of Foreign Application Serial No. 201741020794, filed on Jul. 4, 2017 in India by VMware, Inc., and entitled "TOP-OF-RACK SWITCH REPLACEMENT FOR HYPER-CONVERGED INFRASTRUCTURE COMPUTING ENVIRONMENTS", all of which are expressly incorporated herein in their entireties.

BACKGROUND

Hyper-converged infrastructure (HCI) is a type of virtual computing platform that converges compute, networking, virtualization, and storage into a single software-defined architecture. For instance, a single software application can interact with each of component of hardware and software as well as an underlying operating system. Hyper-converged infrastructures provide enterprises and other organizations with modular and expandable compute, storage, and network resources as well as system backup and recovery. In a hyper-converged infrastructure, compute, storage, and network resources are brought together using preconfigured and integrated hardware.

Since resources in a hyper-converged infrastructure system are pre-configured and highly integrated, replacing a switch in the hyper-converged infrastructure remains problematic. Switches can become overburdened and incapable of handling bandwidth requirements for all hardware connected to the switch. It is difficult to merely swap out a faulty switch with a new switch. For instance, switches in a data center are routinely configured through their lifespan and replacing a switch with another configured the same remains difficult, especially when a device made by one manufacturer is replaced with a device made by a different manufacturer. Additionally, swapping out a switch affects active workloads.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to top-of-rack (TOR) switch replacement in hyper-converged infrastructure computing environments. Hyper-converged computing environments can include thousands of various types of devices, such as servers (also referred to as "nodes" or "hosts") and network switches. Over time, hyper-converged infrastructure services can perform various configurations of a network switch, such as setting a time on the switch, defining network time protocol (NTP) settings, configuring an internet protocol (IP) address for the switch, and configuring the switch for particular workloads. If a switch fails or becomes faulty, it can affect workloads processing in a hyper-converged computing environment. Accordingly, examples described herein can be performed to return workloads back to normal state, for example, by replacing a poorly performing switch with a new switch and configuring the new switch dynamically such that it assumes workloads previously handled by the poorly performing switches.

In one example, a hyper-converged computing environment can include a hyper-converged management service. The hyper-converged management service can maintain a listing of network configurations applied to a first network switch in a rack. The hyper-converged management service can determine that the first network switch is failing or, in other words, has a performance not satisfying a threshold level, referred to as a performance threshold. If the first network switch is failing or has failed, the hyper-converged management service can decommission the first network switch in the rack and configure a second network switch for replacement of the first network switch in the rack. To this end, the hyper-converged management service can access the listing of network configurations applied to the first network switch from the memory and apply the at least one network configuration to the second network switch dynamically. The network configurations applied can include, for example, a switch bring-up configuration, a management cluster configuration, and a workload configuration.

In additional examples, the hyper-converged management service can identify an active workload, configure the second network switch by applying a workload configuration to the second network switch for the active workload, and reassign the active workload to the second network switch. As can be appreciated, the first network switch can be one manufactured by a first manufacturer and the second network switch is manufactured by a second manufacturer. Examples described herein describe quick and programmatic replacement and configuration of switches regardless of the type or manufacturer of the switches.

Figure 1:
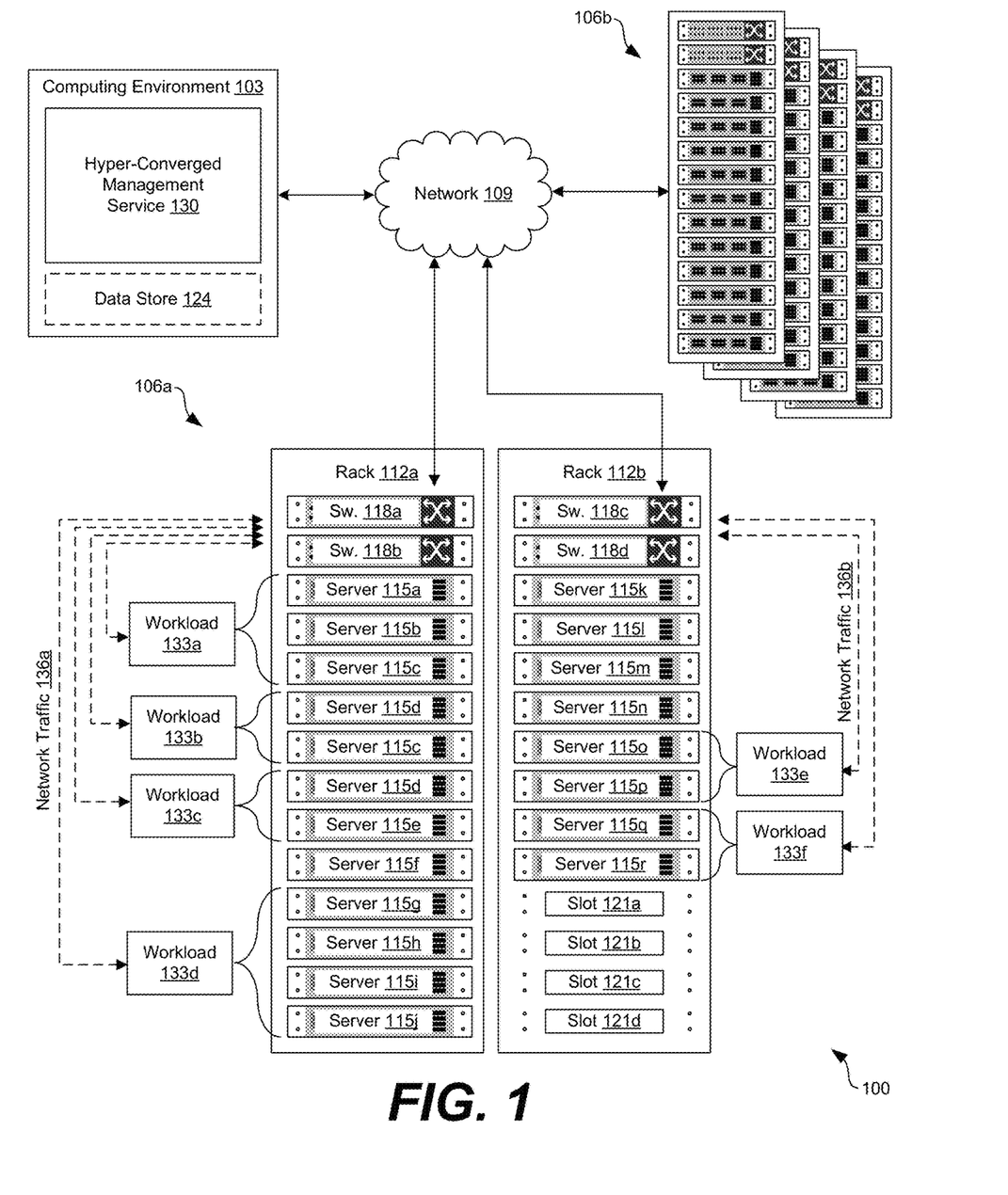
FIG. 1 is a drawing of an example of a hyper-converged computing environment.

With reference to FIG. 1, an example of a hyper-converged computing environment 100 is shown. The hyper-converged computing environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

In various embodiments, the computing systems 106 can include a plurality of devices installed in racks 112 which can make up a server bank or a computer bank in a data center or other like facility. The devices in the computing systems 106 can include any number of physical machines and virtual machines. For example, a computing environment 103 can include an enterprise computing environment that includes hundreds or even thousands of physical and virtual machines implemented in devices stored in racks 112 distributed geographically and connected to one another through the network 109. It is understood that any virtual machine is implemented using at least one physical device.

The devices in the racks 112 can include, for example, memory and storage devices, servers 115a . . . 115r, central processing units (CPUs), graphics processing units (GPUs), switches 118a . . . 118d, power supplies, and similar devices. The devices, such as servers 115 and switches 118, can have dimensions suitable for quick installation in slots 121a . . . 121d on the racks 112. In various examples, the servers 115 can include requisite physical hardware and software to create and manage a virtualization infrastructure. The physical hardware for a server 115 can include a CPU, GPU, data bus, memory, and other components. The servers 115 can include a pre-configured hyper-converged computing device where a hyper-converged computing device includes pre-tested, pre-configured, and pre-integrated storage, server and network components, including software, that are positioned in an enclosure installed in a slot 121 on a rack 112.

Additionally, each server 115 in the hyper-converged computing environment 100 can include a hypervisor. In some examples, a hypervisor can be installed on a server 115 to support a virtual machine execution space within which one or more virtual machines (VMs) can be concurrently instantiated and executed. In some examples, the hypervisor can include VMware ESX™ hypervisor or a VMware ESXi™ hypervisor. It is understood that the computing systems 106 are scalable, meaning that the computing systems 106 in the hyper-converged computing environment 100 can be scaled to include additional servers 115, switches 118, and other components.

Similarly, the computing environment 103 can include, for example, a server or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

Although shown separately from the computing systems 106, it is understood that the computing environment 103 can be implemented in the computing systems 106.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 over the network 109, sometimes remotely, the computing environment 103 can be described as a remote computing environment 103 in some examples. In other examples, the computing environment 103 can be implemented in servers 115 of a rack 112 and can manage operations of a virtualized computing environment. Hence, in some examples, the computing environment 103 can be referred to as a management cluster in the computing systems 106.

The computing environment 103 can include a data store 124. The data store 124 can include memory of the computing environment 103, mass storage resources of the computing environment 103, or any other storage resources on which data can be stored by the computing environment 103. The data store 124 can include memory of the servers 115 in some examples. The data stored in the data store 124, for example, can be associated with the operation of the various services or functional entities described below.

The components executed on the computing environment 103 can include, for example, a hyper-converged management service 130 (also referred to as a hyper-converged network management service) as well as other applications, services, processes, systems, engines, or functionality not discussed in detail herein. The hyper-converged management service 130 can be executed to oversee the operation of the hyper-converged computing environment 100 through management of the computing systems 106 as well as the devices and software that make up the computing systems 106. In some examples, an enterprise, organization, or other entity, can operate the hyper-converged management service 130 to oversee or manage the operation of devices in the racks 112, such as servers 115, switches 118, power supplies, cooling systems, or other components.

Hyper-converged computing devices in the computing systems 106 can process workloads 133a . . . 133f. Workloads 133 can refer to the amount of processing that a server 115 or switch 118 has been instructed to process or route at a given time. The workloads 133 can be associated with applications executing on the servers 115. For instance, the workloads 133 can include tasks to be processed to provide employees of an enterprise with remote desktop sessions or other virtualized computing sessions. The hyper-converged management service 130 can maintain a listing of active or inactive workloads 133 as well as oversee the assignment of various workloads 133 to various devices in the computing systems 106. For instance, the hyper-converged management service 130 can assign a workload 133 lacking in available resources to a server 115 that has resources sufficient to handle the workload 133. The workloads 133 can be routed to various servers 115 by the switches 118 as network traffic 136a . . . 136b.

The hyper-converged management service 130 can also determine benchmarks to evaluate performance of servers 115 and switches 118 in the racks 112. To this end, the hyper-converged management service 130 can determine or generate metrics describing how easily a server 115 processes a workload 133 or how quickly a switch 118 routes network traffic 136, which in turn can be divided into response time reflecting the time between a user request and a response to the request from the computing system 106 as well as throughput reflecting how much work is performed over a given time frame. The hyper-converged management service 130 can generate a performance metric describing how well a server 115 or switch 118 is processing workloads 133. In some examples, the performance metric can include a number or a percentage. The performance metric can be compared to a performance threshold to determine whether a server 115, switch 118, or other component is failing. For instance, a performance threshold can require a server 115 to process workloads 133 at a predefined rate. If a performance metric generated for the server 115 falls below the performance threshold, it can be assumed that the server 115 is failing and a replacement server 115 can be configured as a replacement.

Figure 2:
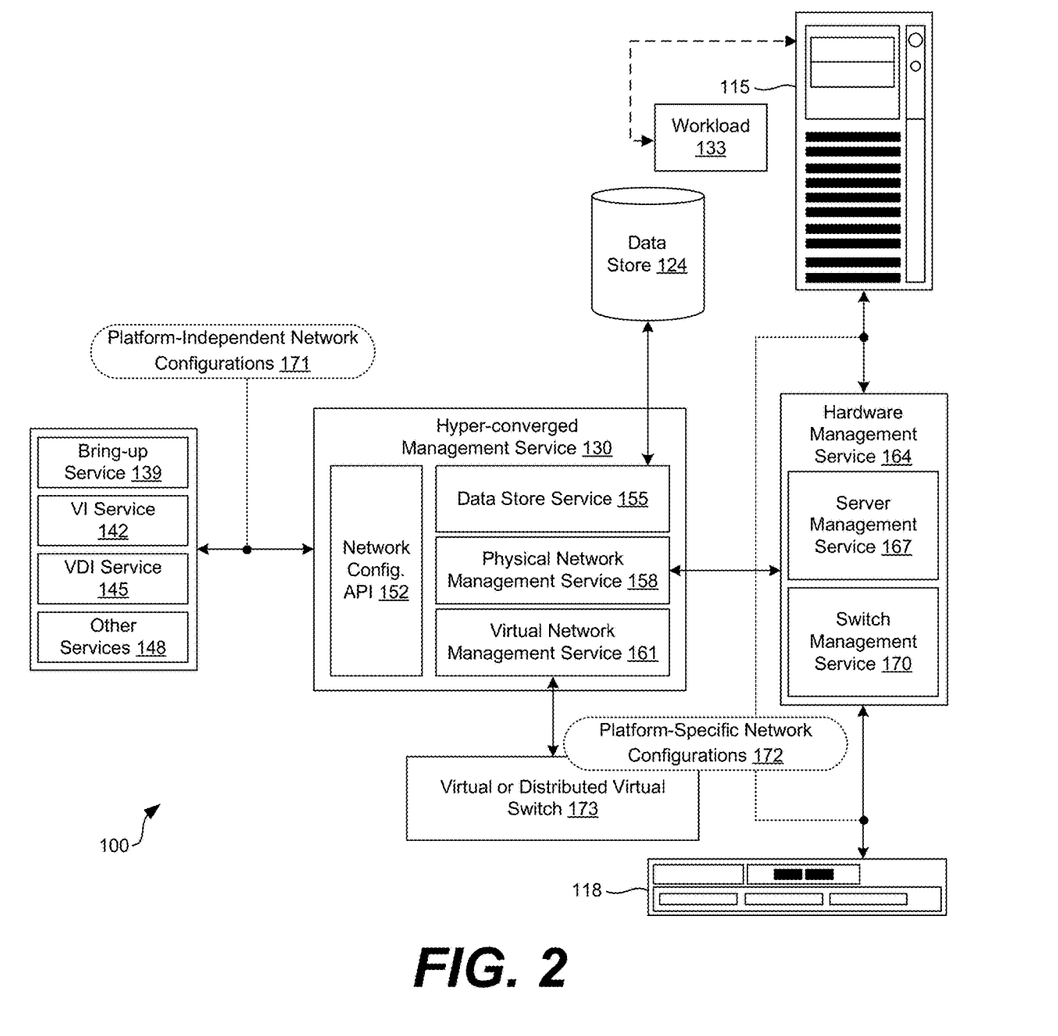
FIG. 2 is a drawing of another example of the hyper-converged computing environment of FIG. 1.

Turning now to FIG. 2, another example of the hyper-converged computing environment 100 is shown. The hyper-converged computing environment 100 illustrates various services interacting with the hyper-converged management service 130. In some examples, the hyper-converged management service 130 can include a service responsible for physical and virtual configurations of devices in the racks 112. In some examples, the hyper-converged management service 130 interacts with a bring-up service 139, a virtual infrastructure (VI) service 142, a virtual desktop infrastructure (VDI) service, as well as other services 148 as can be appreciated.

The bring-up service 139 can be executed to "bring up" a device in a computing system 106 such that it becomes an active part of the hyper-converged computing environment 100. Bringing up a device can include, for example, powering on and configuring a device. For example, when a server 115 or a switch 118 is installed or powered on in the hyper-converged computing environment 100, the bring-up service 139 can configure the server 115 or switch 118 to begin processing or routing workloads 133 as part of the overall environment. The VI service 142 can provides access to the infrastructure management components, such as the objects that can be used to manage, monitor, and control life-cycle operations of virtual machines and other hyper-converged infrastructure components.

The VDI service 145 can include, for example, software that runs a desktop on a user's client device, such as a personal computer, laptop, or smartphone, from the servers 115 in the hyper-converged computing environment 100. In one example, desktop virtualization can include taking a user's desktop workstation and executing it on a server 115 as a virtual machine, such that the user can access the desktop workstation from anywhere using a lightweight client application, also referred to as a "thin client." Because the desktop workstation is hosted on a server 115 that handles all the processing for the desktop, the thin client has very small resource requirements and the client device owned by the user does not need to have powerful computing capabilities.

The bring-up service 139, the VI service 142, the VDI service 145, or other service 148 can be controlled by the hyper-converged management service 130, for example, through a network configuration application programming interface (API) 152. For example, the hyper-converged management service 130 can send various network configurations over the network 109 to various services that will act in accordance with the configurations. In other examples, the bring-up service 139, the VI service 142, the VDI service 145, or other service 148 can be a service implemented in the hyper-converged management service 130.

The hyper-converged management service 130 can include a data store service 155, a physical network management service 158, and a virtual network management service 161. The data store service 155 can oversee storage or retrieval of data from the data store 124. For instance, the data store 124 can include one or more structured query language (SQL) or no-SQL databases and the data store service 155 can perform various queries to access information stored in memory. In some examples, the data store service 155 can retrieve configurations generated for workloads, servers 115, switches 118, or other components of the hyper-converged computing environment 100, as will be discussed.

The physical network management service 158 can oversee operation of physical devices in the computing systems 106. For instance, the physical network management service 158 can interact with a hardware management service 164 to oversee configuration and operation of physical servers 115, physical switches 118, or other hardware devices in the hyper-converged computing environment 100. The hardware management service 164, in some examples, can include a server management service 167, a switch management service 170, as well as other services. The server management service 167 can configure and oversee operation of the physical servers 115 in the computing systems 106 of the hyper-converged computing environment 100. Similarly, the switch management service 170 can configure and oversee operation of the physical switches 118 in the computing systems 106 of the hyper-converged computing environment 100.

In some examples, the hardware management service 164 can translate type- or platform-independent network configurations 171 to platform-specific network configurations 172. For instance, the hyper-converged management service 130 can maintain network configurations applied to switches 118 in the hyper-converged computing environment 100. However, those network configurations can be type- or platform-independent, meaning the network configurations applied to a first type of switch 118 (a switch 118 manufactured by AlphaCo) can be identical to network configurations applied to another type of switch 118 (a switch 118 manufactured by BetaCo). In other words, the network configurations are not specific to a particular type, model, version, or manufacturer of switch 118, but are instead specific to and capable of being interpreted by the hyper-converged management service 130. The hardware management service 164 can translate a type-independent network configuration 171 to one that can be interpreted by an API of the switch 118 or the server 115, referred to as a platform-specific network configuration 172. The translated network configurations can be specific to a particular manufacturer, as can be appreciated. In one example, the type-independent network configuration 171 can include a VMWare® Cloud Foundation (VCF) network configuration. The hardware management service 164 can translate the VCF network configuration to a network configuration specific to Cisco®, Huawei®, Hewlett Packard®, IBM®, Cumulus®, or other types of switches.

The virtual network management service 161 can oversee operation of virtual devices in the computing systems 106. For example, the virtual network management service 161 can oversee operation of virtual servers, virtual LANs, virtual or distributed virtual switches 173, as well as other virtual devices in the hyper-converged computing environment 100.

Next, a general description of the operation of the various components of the hyper-converged computing environment 100 is provided. A first network switch 118a can reside in a slot 121 on a rack 112 of a data center or other similar environment. The hyper-converged management service 130 can maintain network configurations applied to a first network switch 118a in the data store 124 or other memory. In some examples, the network configurations can include switch bring-up configurations, management cluster configurations, workload configurations, and similar configurations.

The hyper-converged management service 130 can determine performance metrics for servers 115, switches 118, and other devices in the rack 112. In one example, the hyper-converged management service 130 can determine a performance metric for the first network switch 118a. For instance, the performance metric can describe how well the first network switch 118a is processing workloads 133. In some examples, the performance metric can include a number or a percentage.

In some examples, the hyper-converged management service 130 can determine the performance metric using a bandwidth percentage for a send operation, a bandwidth percentage for a receive operation, a data rate for a send operation, a data rate for a receive operation, a total data rate, a total port error rate, a port frame rate for send operations, a port frame rate for receive operations, a total port frame rate, a peak data rate for send operations, a peak data rate for receive operations, a link quality percentage, an overall port frame size, a port frame size for send operations, a port frame size for receive operations, as well as other measures of performance.

Additionally, the hyper-converged management service 130 can determine whether the first network switch 118a has a performance metric that fails to meet a performance threshold. In one example, the hyper-converged management service 130 can compare the performance metric to a performance threshold to determine whether the first network switch 118a, or sub-component thereof, is failing. For instance, a performance threshold can require the first network switch 118a to process workloads 133 at a predefined rate. If a performance metric generated for the first network switch 118a does not fall below the performance threshold, it can be assumed that the first network switch 118a is operating as intended. On the other hand, if a performance metric generated for the first network switch 118a falls below the performance threshold, it can be assumed that the first network switch 118a is failed or has failed.

Ultimately, the hyper-converged management service 130 can decommission the first network switch 118a that is failing and cause a second network switch 118b to be installed in a rack 112 as a replacement for the first network switch 118a that. While the first network switch 118a is decommissioned and while the second network switch 118b is being installed, a third network switch 118c in the rack 112 can assume the workloads 133 of the first network switch 118a to be replaced. When the second network switch 118b is installed in the rack 112 by an administrator or other personnel, the hyper-converged management service 130 can configure the second network switch 118b using, for example, configurations having been previously applied to the first network switch 118a, such as those stored in the data store 124. For example, the hyper-converged management service 130 can apply switch bring-up network configurations, management cluster bring-up network configurations, workflow configurations, and similar configurations having been previously applied to the first network switch 118a.

As the first network switch 118 has been decommissioned and taken down, the hyper-converged management service 130 can further analyze actives workload 133 in a rack 112 to redistribute the workloads 133 by assigned all or a portion of the workloads 133 to the second network switch 118b. For instance, as the first network switch 118a has been decommissioned, some or all of the active workloads 133 can be assigned to another switch 118 in the rack 112. Each of the workloads 133 in the rack 112 can be analyzed to determine whether to redistribute the workloads 133 to the second network switch 118b newly installed in the rack 112. Additionally, the hyper-converged management service 130 can configure the network switch 118 for the workload 133. For instance, any network configurations that were previously applied to the first network switch 118a can be reapplied to the second network switch 118b.

Figure 3:
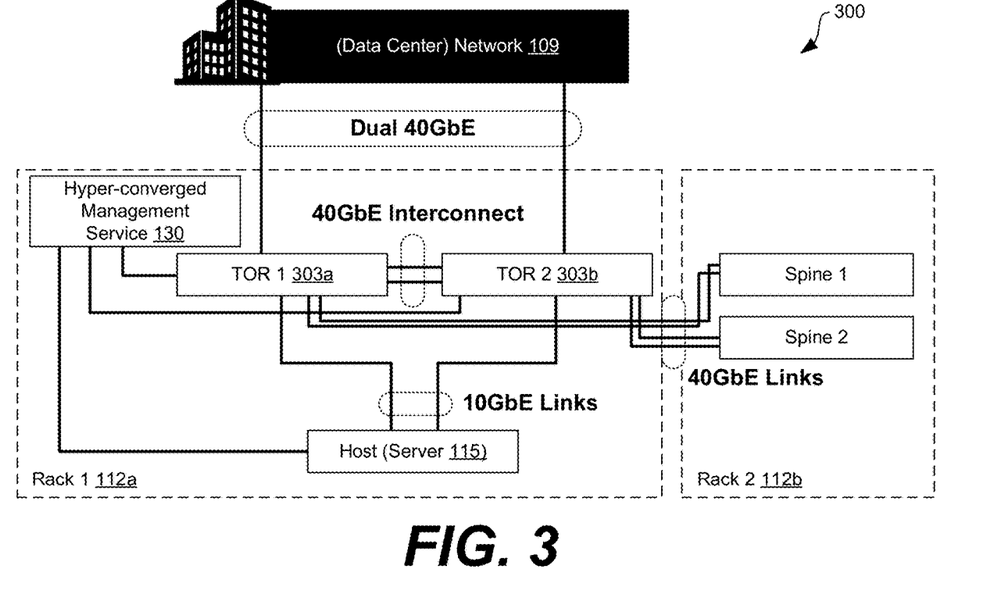
FIG. 3 is a drawing of an example of a wiring diagram used to replace a device in a hyper-converged computing environment.

Referring next to FIG. 3, an example of a wiring diagram 300 used to replace a device in the hyper-converged computing environment 100 is shown. In some situations, a component of the hyper-converged computing environment 100, such as a switch 118, can fail and potentially require replacement. When a switch 118 fails, the workloads 133 assigned to the computing device become non-operational. Accordingly, in some examples, the hyper-converged management service 130 can evaluate current inventory of the hyper-converged computing environment 100 to identify other eligible and available devices available that can be used to return a workload 133 back to a healthy state. If no devices are available and eligible for replacement, an administrator can be instructed to add or replace a switch 118 in the rack 112, for example, per the wiring diagram shown in FIG. 3. For instance, a replacement host, such as a replacement server 115, can be installed in a first rack 112a and coupled to the hyper-converged management service 130 and one or more TOR devices 303a . . . 303b can oversee routing of network traffic 136 for the rack. The TOR devices 303 can include switches 118. While examples described herein relate to TOR devices 303, in other examples, the TOR devices 303 can be end-of-row (EOR) devices.

Figure 4:
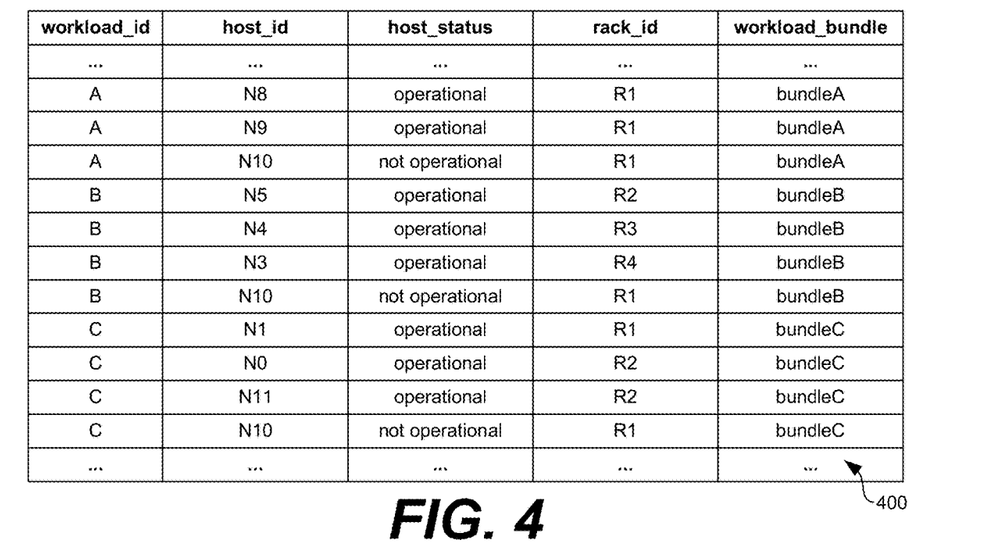
FIG. 4 is a drawing of an example database format for a workload detail table that maintains a listing of workloads in the hyper-converged computing environment.

Turning now to FIG. 4, an example format for a database 400 used to maintain a workload detail table for workloads 133 in a hyper-converged computing environment 100 is shown according to various examples. The database 400 can be stored in the data store 124 for access by the data store service 155. Additionally, the data store service 155 can update or remove entries in the database 400. Each entry in the database 400 can correspond to a workload 133 in the hyper-converged computing environment 100. Each workload 133 can be assigned an identifier (workload_id), an identifier for a server 115 hosting the workload 133 (host_id), a status of the host server 115, and an identifier for the rack 112 in which the server 115 is located (rack_id). As some workloads 133 can be coalesced with other workloads 133, the database 400 can further include a bundle identifier (workload_bundle). A bundle of workloads 133 can be assigned to a server 115 or a group of servers 115. The identifier of the workload 133 (workload_id) can include a string that uniquely identifies a workload 133.

As the database 400 has multiple entries for a single workload 133, workload A for example, the database 400 illustrates that workload A is assigned to multiple servers 115, such as N8, N9, and N10, which are identifiers for the servers 115. The status of the server 115 can include "operational," "not operational," or some other value indicative of whether the server 115 is performing in accordance with its specifications. If the status of the server 115 is "not operational," the hyper-converged management service 130 can attempt to reassign a workload 133. For instance, as N10 is "not operational," the workloads 133 can be reassigned from N10 to another server 115.

Figure 5:
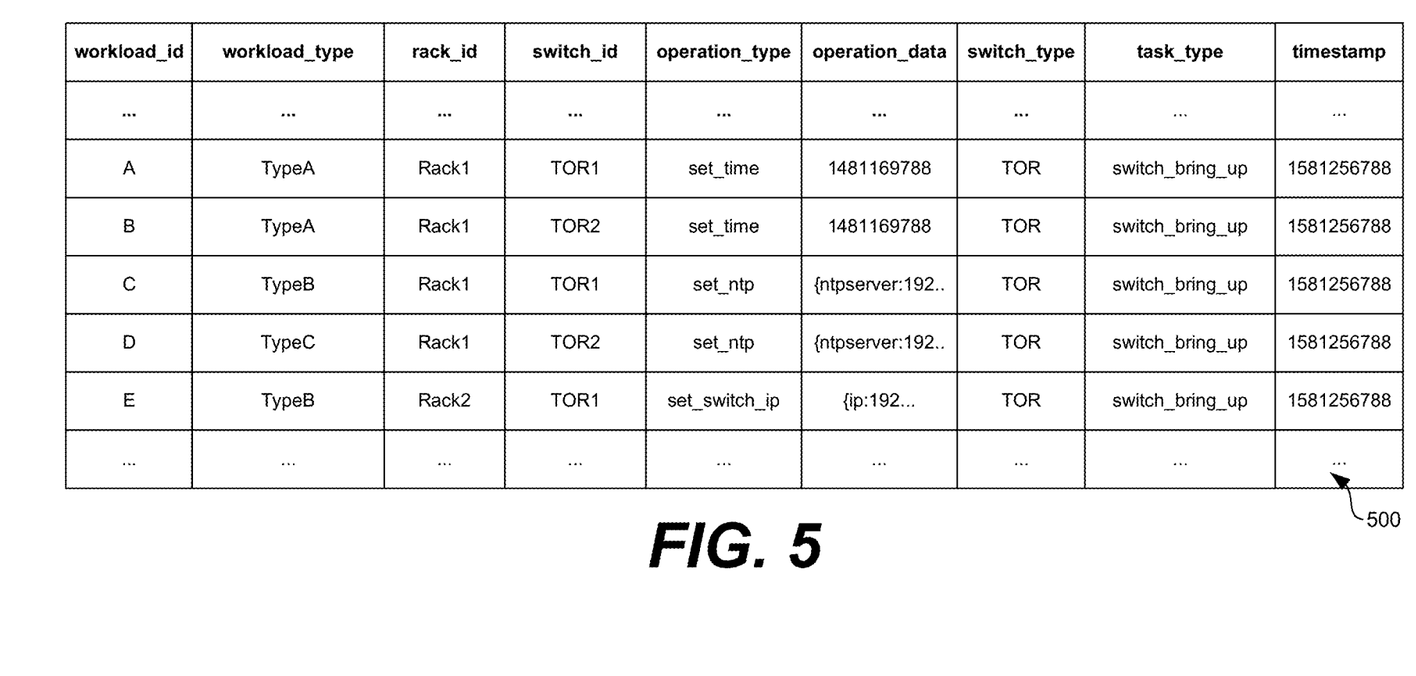
FIG. 5 is a drawing of an example database table for maintaining network configurations applied to network switches in the hyper-converged computing environment.
Figure 6:
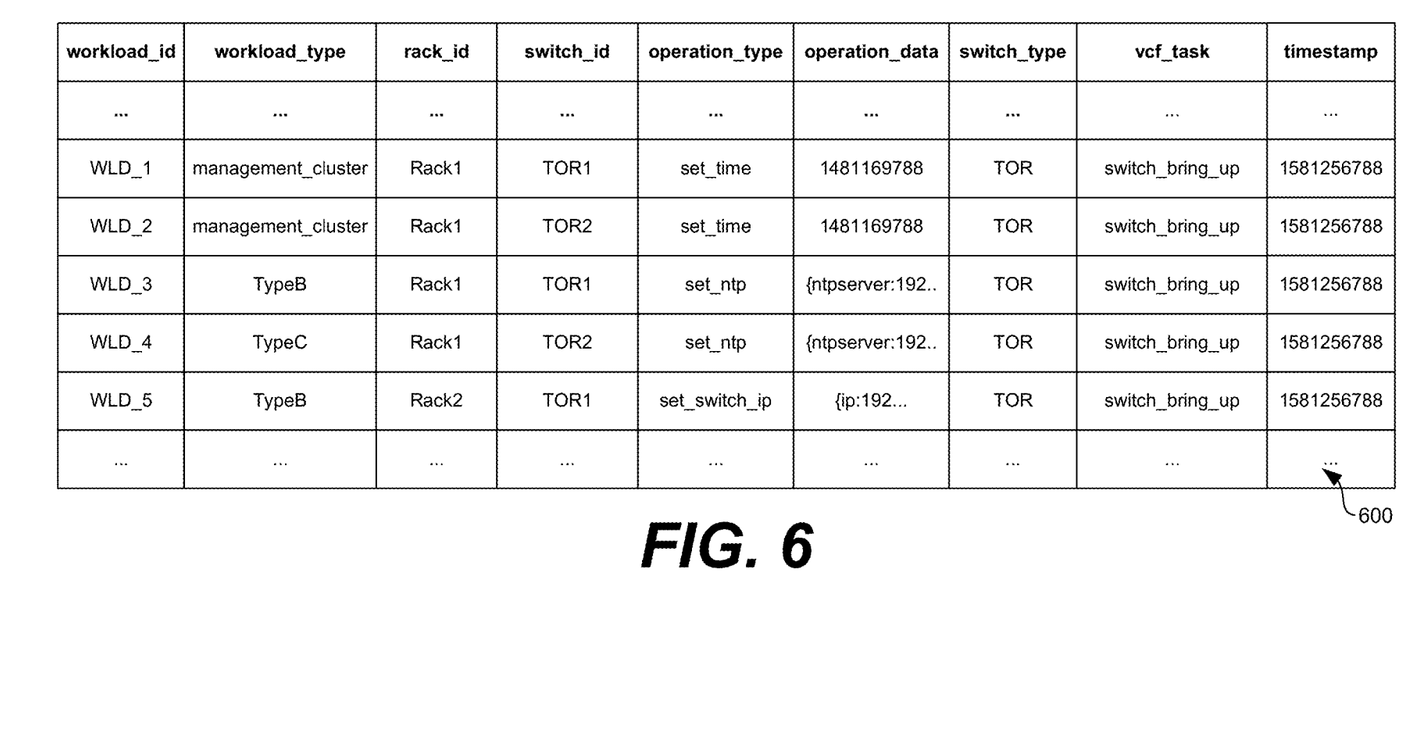
FIG. 6 is another drawing of an example database table for maintaining network configurations applied to network switches in the hyper-converged computing environment.

Moving on to FIGS. 5 and 6, databases 500 and 600 are shown as examples of database tables used to maintain network configurations applied to network switches 118 in the hyper-converged computing environment 100 according to various examples. The databases 500 and 600 can be stored in the data store 124 for access by the data store service 155. Additionally, the data store service 155 can update or remove entries in the databases 500 and 600. Each entry in the databases 500 and 600 can correspond to a workload 133 active (or inactive) in the hyper-converged computing environment 100. In some examples, the databases 500 and 600 can include rows for each network configuration applied to a network switch 118. For a given network configuration applied, the databases 500 and 600 can include a workload identifier, a workload type, a rack identifier, a switch identifier, an operation type, operation data, a switch type, a type of task, and a timestamp at which the network configuration was performed. The workload identifier can include a string of alphanumeric or other characters that uniquely identifies a workload 133. The workload type can include a type of workload 133. The rack identifier can include a string of alphanumeric or other characters that uniquely identifies a rack 112 in which a workload 133 is active or in which a network switch 118 resides. The operation type can include a type of network configuration applied to the network switch 118. The operation data can include a data structure used to apply the network configuration. In some examples, the data structure is store in plain text using proper XML or other schema such that the data structure can be quickly access and used to configure other network switches 118. The switch type can include, for example, a TOR switch or other type of switch.

Specifically, FIG. 5 shows network configurations applied to a network switch 118 when a bring-up or boot-up operation for a rack 112 is performed. For instance, the hyper-converged management service 130 can configure the switches 118 in the rack 112 and store some or all of the operations performed on the switches 118 during the bring-up operation. The hyper-converged management service 130 can store the network configurations based on a type of operation performed as well as a timestamp for a time at which the operation was performed.

FIG. 6 shows network configurations applied to a network switch 118 when a management cluster operation is performed. For instance, the hyper-converged management service 130 can configure the switches 118 in the rack 112 and store some or all of the operations performed on the switches 118 during the management cluster operation. The hyper-converged management service 130 can store the network configurations based on a type of operation performed as well as a timestamp for a time at which the operation was performed.

Figure 7:
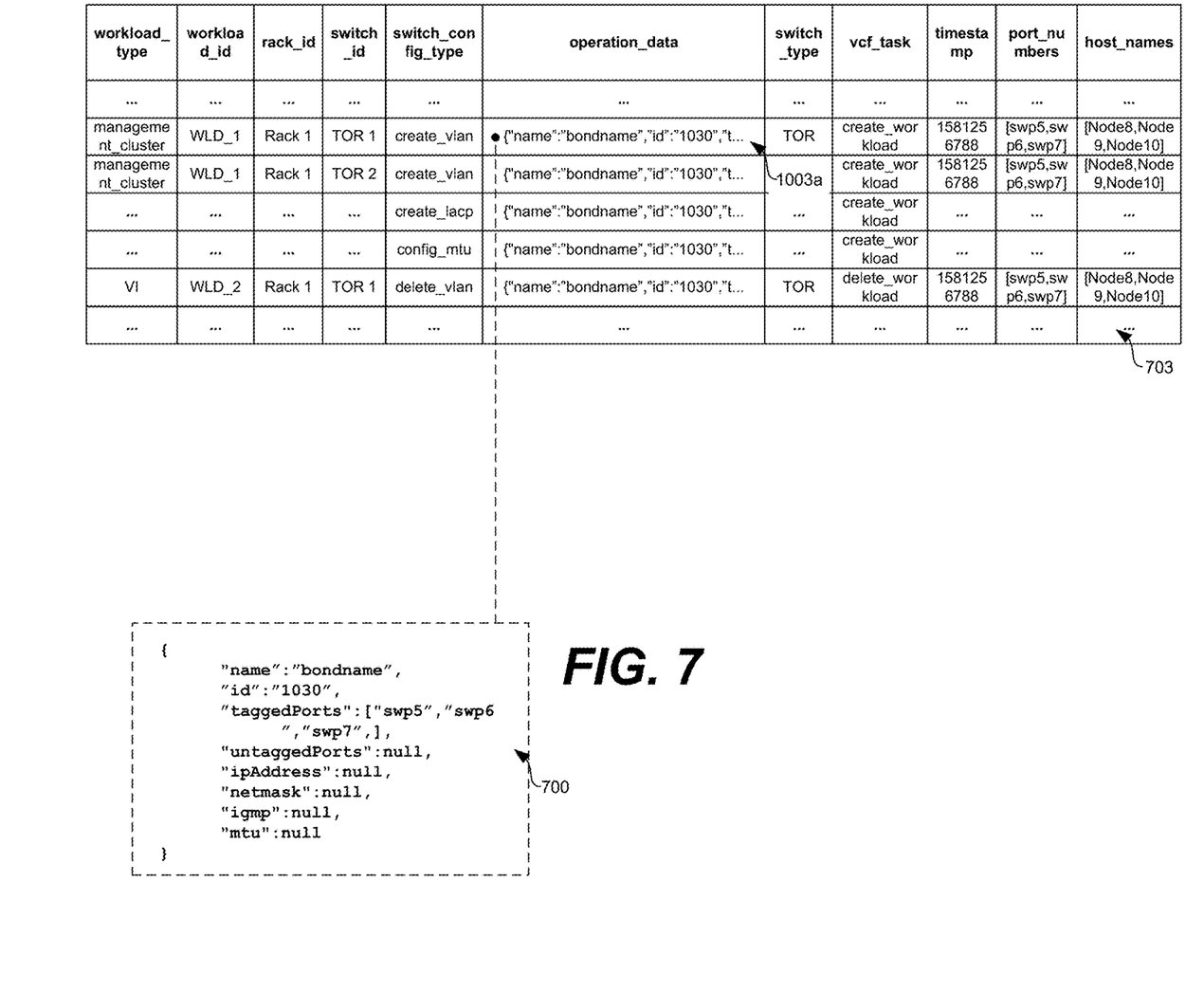
FIG. 7 is another drawing of an example database table for maintaining network configurations applied to network switches in the hyper-converged computing environment.
Figure 8:
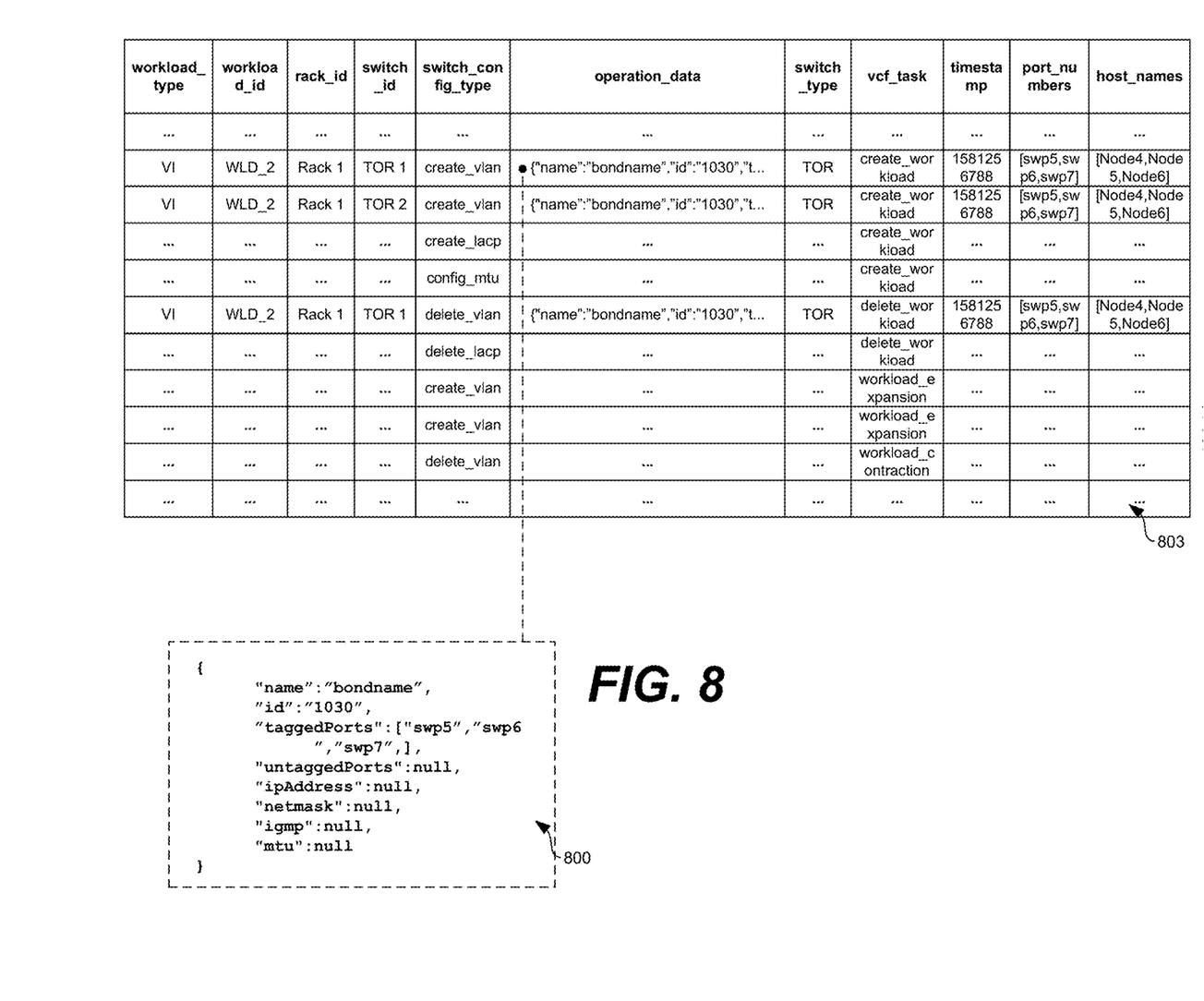
FIG. 8 is another drawing of an example database table for maintaining network configurations applied to network switches in the hyper-converged computing environment.

Turning now to FIGS. 7 and 8, example data structures 700 and 800 that include information pertaining to network configurations applied to network switches 118 are shown according to various examples. In some examples, the data structures 700 and 800 can be stored in databases 703 and 803 as plain text in accordance with XML schema or other schema requirements for quick access and for quickly configuring other network switches 118 using configurations previously applied to a network switch 118 being replaced. To this end, the data structures 700 and 800 can include information pertaining to network configurations performed on network switches 118 by the hyper-converged management service 130. The data structure 700 and 800 also can be stored in the data store 124 for access by the data store service 155.

Figure 9:
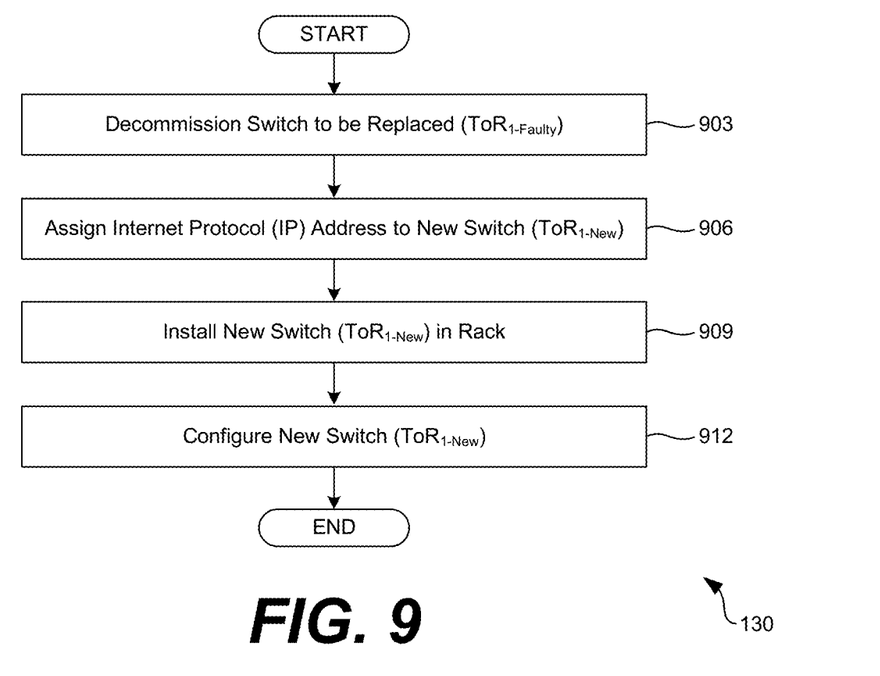
FIG. 9 is a flowchart illustrating functionality implemented by components of the hyper-converged computing environment.

Moving on to FIG. 9, shown is a flowchart that provides one example of the operation of a portion of the hyper-converged computing environment 100. The flowchart of FIG. 9 can be viewed as depicting an example of elements of a method implemented by the hyper-converged management service 130 executing in the computing environment 103 according to one or more examples. The separation or segmentation of functionality as discussed herein is presented for illustrative purposes only.

Beginning with step 903, the hyper-converged management service 130 can "bring down" or decommission the first network switch 118a so that a new second network switch 118b can be brought in as a replacement in the rack 112. In racks 112 in which two or more network switches 118 exist, decommissioning of the first network switch 118a can cause traffic to flow to other network switches 118 in the rack 112. For instance, as shown in FIGS. 1 and 3, a rack 112 can include two TOR switches 118a . . . 118b. When a switch 118 in the rack 112 is decommissioned, the workload 133 can be transferred to the remaining active switch 118.

In step 906, the hyper-converged management service 130 can assign an IP address to the new switch 118. In some examples, an administrator can manually configure the new switch 118 to have a predetermined IP address, username, password, or other setting.

Thereafter, in step 909, the new switch 118 can be installed in the rack 112. In some examples, an administrator of a data center can install the new switch 118 in the rack 112, for example, in accordance with the wiring diagram shown in FIG. 3.

Finally, in step 912, the hyper-converged management service 130 can configure the second network switch 118b. In some examples, the hyper-converged management service 130 can configure the second network switch 118b by accessing a network configuration applied to the first network switch 118a from the data store 124 and applying the network configuration to the second network switch 118b. In additional examples, workloads 133 previously assigned to the first network switch 118a can be reassigned to the second network switch 118b now installed in the rack 112. Configuration of the second network switch 118b is described in greater detail below with respect to FIG. 11. Thereafter, the process can proceed to completion.

Figure 10:
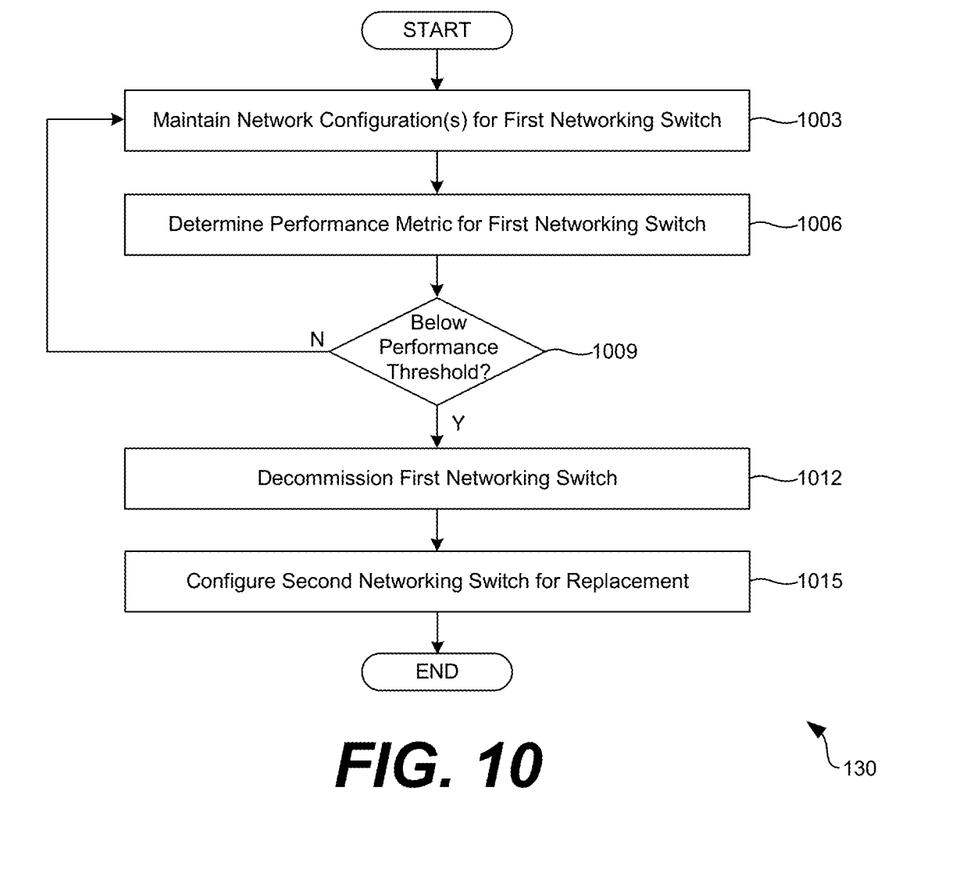
FIG. 10 is a flowchart illustrating functionality implemented by components of the hyper-converged computing environment.

Turning now to FIG. 10, shown is a flowchart that provides one example of the operation of a portion of the hyper-converged computing environment 100. The flowchart of FIG. 10 can be viewed as depicting an example of elements of a method implemented by the hyper-converged management service 130 executing in the computing environment 103 according to one or more examples. The separation or segmentation of functionality as discussed herein is presented for illustrative purposes only.

Beginning with step 1003, the hyper-converged management service 130 can maintain network configurations applied to a first network switch 118a in the data store 124 or other memory, where the first network switch 118a is implemented in a rack 112. In some examples, the network configurations can include switch bring-up configurations, management cluster configurations, workload configurations, and similar configurations.

In step 1006, the hyper-converged management service 130 can determine a performance metric for the first network switch 118a. The performance metric can describe how well the first network switch 118a is processing workloads 133.

In some examples, the performance metric can include a number or a percentage. The hyper-converged management service 130 can determine the performance metric using metrics determined for send operations, receive operations, or a combination thereof. In some examples, the hyper-converged management service 130 can determine the performance metric using a bandwidth percentage for a send operation, a bandwidth percentage for a receive operation, a data rate for a send operation, a data rate for a receive operation, a total data rate, a total port error rate, a port frame rate for send operations, a port frame rate for receive operations, a total port frame rate, a peak data rate for send operations, a peak data rate for receive operations, a link quality percentage, an overall port frame size, a port frame size for send operations, a port frame size for receive operations, as well as other measures of performance.

In step 1009, the hyper-converged management service 130 can determine whether the first network switch 118a has a performance metric satisfying a performance threshold or, in other words, has a performance metric falling below a performance threshold. In one example, the hyper-converged management service 130 can compare the performance metric to a performance threshold to determine whether the first network switch 118a, or sub-component thereof, is failing. For instance, a performance threshold can require the first network switch 118a to process workloads 133 at a predefined rate. If a performance metric generated for the first network switch 118a does not fall below the performance threshold, it can be assumed that the first network switch 118a is operating as intended and the process can revert to step 1003 where network configurations continue to be maintained by the hyper-converged management service 130 until the switch 118 starts failing.

Alternatively, if the performance metric generated for the first network switch 118a falls below the performance threshold, it can be assumed that the first network switch 118a is failing or has failed and the process can proceed to step 1012. In step 1012, the hyper-converged management service 130 can "bring down" or decommission the first network switch 118a so that a second network switch 118b can be brought in as a replacement in the rack 112. Decommissioning of the first network switch 118a can cause traffic to flow another network switch 118 in the rack 112. For instance, as shown in FIGS. 1 and 3, a rack 112 can include two TOR switches 118a . . . 118b. When a switch 118 in the rack 112 is decommissioned, the workload 133 is transferred to the remaining active switch 118.

In step 1015, the hyper-converged management service 130 can configure the second network switch 118b as a replacement for the first network switch 118a that is failing. In some examples, the hyper-converged management service 130 can configure the second network switch 118b by accessing a network configuration applied to the first network switch 118a from the data store 124 and applying the network configuration to the second network switch 118b. Configuration of the second network switch 118b is described in greater detail below with respect to FIG. 11. Thereafter, the process can proceed to completion.

Figure 11:
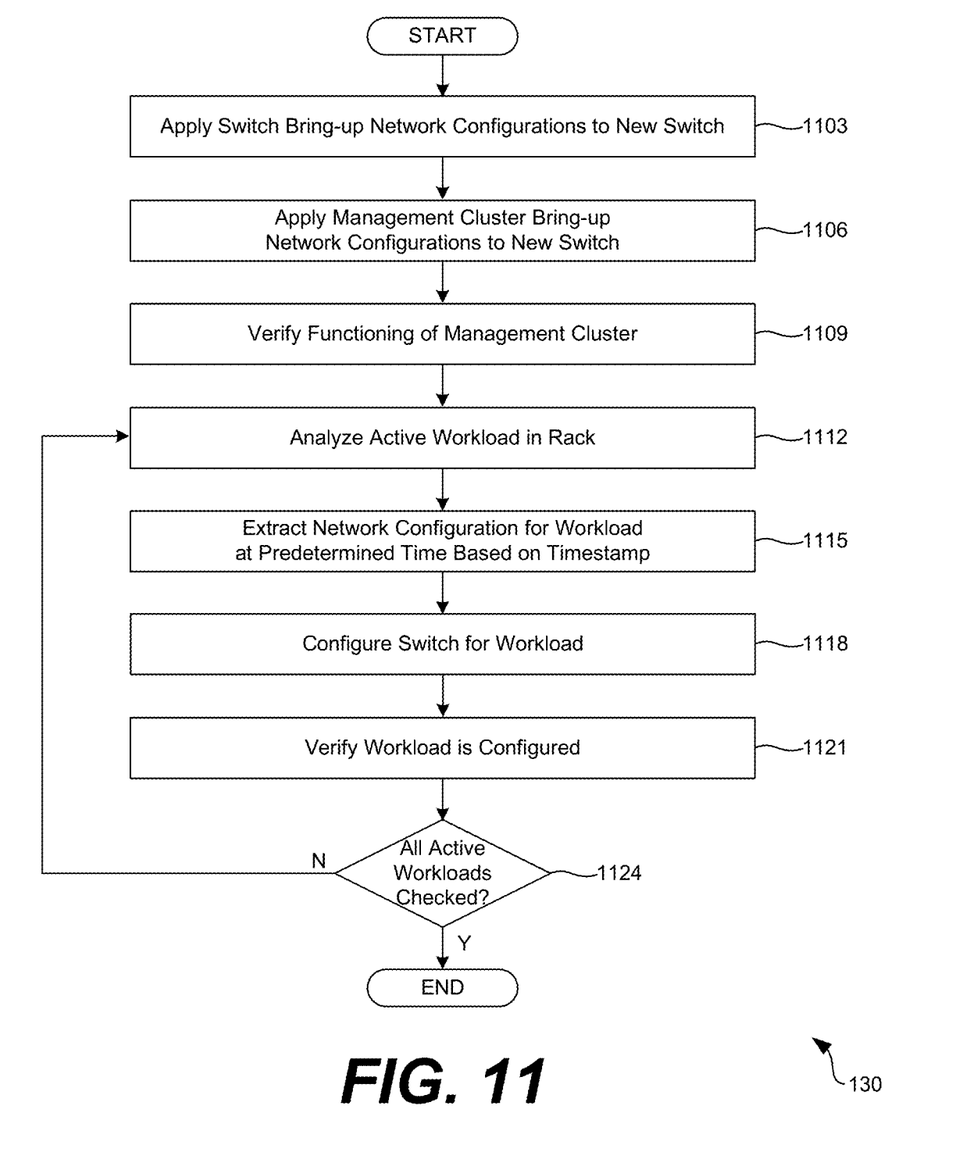
FIG. 11 is a flowchart illustrating functionality implemented by components of the hyper-converged computing environment.

Referring next to FIG. 11, shown is a flowchart that provides one example of the operation of a portion of the hyper-converged computing environment 100. The flowchart of FIG. 11 can be viewed as depicting an example of elements of a method implemented by the hyper-converged management service 130 executing in the computing environment 103 according to one or more examples. The separation or segmentation of functionality as discussed herein is presented for illustrative purposes only.

As noted above with respect to FIG. 10, a second network switch 118b can be installed in a rack 112 as a replacement for a first network switch 118a is failing. While the first network switch 118a is decommissioned and while the second network switch 118b is being installed, a third network switch 118c still in the rack 112 can assume the workloads 133 of the first network switch 118a to be replaced. When the second network switch 118b is installed in the rack 112, the hyper-converged management service 130 can configure the second network switch 118b.

Beginning with step 1103, the hyper-converged management service 130 can apply switch bring-up network configurations to the new switch 118, such as the second network switch 118b described in FIG. 10. In some examples, the hyper-converged management service 130 set a time on the switch 118. In additional examples, the hyper-converged management service 130 can apply various configurations by isolating traffic between two workloads using a VLAN, applying link aggregation on ports of the switch 118, configuring Layer 2 (L2) or Layer 3 (L3) uplinks, routing, and configuring virtual router redundancy protocols (VRRPs).

Next, in step 1106, the hyper-converged management service 130 can apply management cluster bring-up network configurations to the switch 118. For instance, the hyper-converged management service 130 as well as other components of the computing environment 103 can execute on servers 115 in the rack 115 as a management cluster. The hyper-converged management service 130, acting as a management cluster, can manage the switches 118, for example, by performing workload 133 and switch 118 management, configuring IP addresses, configuring NTP settings, applying certificates, rotating passwords, inventorying the switch 118 or other devices in the rack 112, or other operation.

In step 1109, the hyper-converged management service 130 can verify that the management cluster is functioning as intended, for example, by determining whether the management cluster bring-up network configurations were properly applied in step 1106.

Next, in step 1112, the hyper-converged management service 130 can analyze an active workload 133 in a rack 112. For instance, as the first network switch 118a has been decommissioned, some or all of the active workloads 133 can be assigned to another switch 118 in the rack 112. Each of the workloads 133 in the rack 112 can be analyzed to determine whether to redistribute the workloads 133 to the second network switch 118b newly installed in the rack 112.

Thus, in step 1115, the hyper-converged management service 130 can extract a network configuration for workload 133 identified in step 1112. In some examples, the hyper-converged management service 130 can extract a network configuration for workload 133 at a time specified by a timestamp. For instance, the timestamp can indicate when the workload 133 was reassigned from the faulty network switch 118 to the other network switch 118 in the rack 112.

In step 1118, the hyper-converged management service 130 can configure the network switch 118 newly installed in the rack 112 for the workload 133. For instance, any network configurations that were previously applied to the first network switch 118a can be reapplied to the new, second network switch 118b.

In step 1121, the hyper-converged management service 130 can verify that the switch 118 is properly configured for the workload 133. For instance, the hyper-converged management service 130 can determine whether configurations applied to the second network switch 118b are consistent with those applied to the faulty, first network switch 118a. Thereafter, in step 1124, hyper-converged management service 130 can determine whether all active workloads 133 in the rack 112 have been checked. If additional active workloads 133 remain to be analyzed, the process can revert to step 1112 and another workload 133 can be smartly analyzed. Alternatively, if all workloads 133 active in the rack 112 have been analyzed, the process can proceed to completion.

The servers 115, the switches 118, or other devices comprising the computing environment 103 and the computing systems 106 can include at least one processor circuit, for example, having at least one hardware processor and at least one physical memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. Also stored in the memory can be a data store 124 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the hyper-converged management service 130. These client devices can include a display upon which a user interface generated by a client application can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the hyper-converged management service 130 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device comprising at least one processor; and
   at least one memory comprising executable instructions that cause the at least one computing device to at least:
   apply at least one bring-up network configuration to a network switch to install the network switch in a rack;
   analyze an active workload executed by a server device within the rack to identify at least one workload network configuration specified for the active workload in a data structure that lists the active workload in association with the least one workload network configuration, the server device, and a particular network switch assigned to the active workload;
   reassign the active workload executed by the server device to the network switch from the particular network switch, wherein the data structure is updated to indicate that the network switch is assigned to the active workload; and
   configure the network switch based on the at least one workload network configuration for the active workload executed by the server device, wherein the at least one workload network configuration is extracted from the data structure and applied to the network switch in response to the active workload being reassigned to the network switch.

2. The system of claim 1, wherein the at least one bring-up network configuration comprises at least one of: a switch bring-up configuration, and a management cluster bring-up configuration.

3. The system of claim 1, wherein the instructions further cause the at least one computing device to at least:
   extract a particular workload network configuration for the active workload based on a time specified by a timestamp, wherein the switch is configured based on the at least one workload network configuration comprising the particular workload network configuration.

4. The system of claim 3, wherein the timestamp indicates a time when the active workload was reassigned from the particular network switch to the network switch.

5. The system of claim 1, wherein the instructions further cause the at least one computing device to at least:
   verify that the network switch is properly configured for the active workload.

6. The system of claim 5, wherein the network switch is verified to be properly configured based on a comparison with a network configuration for the particular network switch.

7. The system of claim 1, wherein the network switch is installed in the rack as a replacement for the faulty network switch.

8. A non-transitory computer-readable medium embodying executable instructions that cause the at least one computing device to at least:
   apply at least one bring-up network configuration to a network switch to install the network switch in a rack;
   analyze an active workload executed within the rack to identify at least one workload network configuration specified for the active workload in a data structure that lists the active workload in association with the least one workload network configuration, and a particular network switch assigned to the active workload;
   reassign the active workload to the network switch from the particular network switch; and
   configure the network switch based on the at least one workload network configuration for the active workload, wherein the at least one workload network configuration is extracted from the data structure and applied to the network switch in response to the active workload being reassigned to the network switch.

9. The non-transitory computer-readable medium of claim 8, wherein the at least one bring-up network configuration comprises at least one of: a switch bring-up configuration, and a management cluster bring-up configuration.

10. The non-transitory computer-readable medium of claim 8, wherein the instructions further cause the at least one computing device to at least:
    extract a particular workload network configuration for the active workload based on a time specified by a timestamp, wherein the switch is configured based on the at least one workload network configuration comprising the particular workload network configuration.

11. The non-transitory computer-readable medium of claim 10, wherein the timestamp indicates a time when the active workload was reassigned from the particular network switch to the network switch.

12. The non-transitory computer-readable medium of claim 8, wherein the instructions further cause the at least one computing device to at least:
    verify that the network switch is properly configured for the active workload.

13. The non-transitory computer-readable medium of claim 12, wherein the network switch is verified to be properly configured based on a comparison with a network configuration for the particular network switch.

14. The non-transitory computer-readable medium of claim 8, wherein the network switch is installed in the rack as a replacement for the faulty network switch.

15. A computer-method performed by instructions executed by at least one computing device, the method comprising:
    applying, by the at least one computing device, at least one bring-up network configuration to a network switch to install the network switch in a rack;
    analyzing, by the at least one computing device, an active workload executed within the rack to identify at least one workload network configuration specified for the active workload in a data structure that lists the active workload in association with the least one workload network configuration, and a particular network switch assigned to the active workload;
    reassigning, by the at least one computing device, the active workload to the network switch from the particular network switch; and
    configuring, by the at least one computing device, the network switch based on the at least one workload network configuration for the active workload, wherein the at least one workload network configuration is extracted from the data structure and applied to the network switch in response to the active workload being reassigned to the network switch.

16. The method of claim 15, wherein the at least one bring-up network configuration comprises at least one of: a switch bring-up configuration, and a management cluster bring-up configuration.

17. The method of claim 15, further comprising:
    extracting a particular workload network configuration for the active workload based on a time specified by a timestamp, wherein the switch is configured based on the at least one workload network configuration comprising the particular workload network configuration.

18. The method of claim 17, wherein the timestamp indicates a time when the active workload was reassigned from the particular network switch to the network switch.

19. The method of claim 15, further comprising:
    verifying that the network switch is properly configured for the active workload.

20. The method of claim 19, wherein the network switch is verified to be properly configured based on a comparison with a network configuration for the particular network switch.

* * * * *